United States Patent [19]
Stanek

[11] Patent Number: 6,046,754
[45] Date of Patent: Apr. 4, 2000

[54] DISPLAY SHUTTER DEVICE FOR VIEW PROTECTION ON A PORTABLE COMPUTER

[75] Inventor: James B. Stanek, Dakota Dunes, S. Dak.

[73] Assignee: Gateway 2000, Inc., North Sioux City, S. Dak.

[21] Appl. No.: 08/964,121

[22] Filed: Nov. 4, 1997

[51] Int. Cl.[7] .............................. H04N 5/64; H05K 5/00
[52] U.S. Cl. ...................... 345/905; 345/169; 348/842; 353/75
[58] Field of Search ..................... 348/842, 834; 359/601; 364/708.1; D14/106, 100; 353/75; 345/905, 169; 361/681

[56] References Cited

U.S. PATENT DOCUMENTS

| | | |
|---|---|---|
| 1,889,765 | 12/1932 | Switkes . |
| 2,115,334 | 4/1938 | Kaufmann ................................. 190/41 |
| 2,482,031 | 9/1949 | Rose ........................................ 348/842 |
| 2,759,178 | 8/1956 | Rose ........................................ 348/842 |
| 3,263,779 | 8/1966 | Bialer ....................................... 109/51 |
| 4,506,344 | 3/1985 | Hubbard ................................. 364/900 |
| 4,643,281 | 2/1987 | Erickson ................................. 190/119 |
| 4,689,761 | 8/1987 | Yurchenco ............................. 364/708 |
| 5,218,474 | 6/1993 | Kirschner ............................... 359/601 |
| 5,242,056 | 9/1993 | Zia et al. ................................ 206/576 |
| 5,249,653 | 10/1993 | King ....................................... 190/109 |
| 5,325,970 | 7/1994 | Dillon et al. ........................... 206/576 |
| 5,400,903 | 3/1995 | Cooley ................................... 206/320 |
| 5,717,566 | 2/1998 | Tao ......................................... 348/834 |
| 5,877,896 | 3/1999 | Gremban ................................ 359/601 |
| 5,905,546 | 5/1999 | Giulie et al. ........................... 359/601 |
| 5,909,315 | 6/1999 | Keehn ..................................... 359/601 |

OTHER PUBLICATIONS

"Glare Contol—Mobile Gear Glare Stopper", Product Information published by Mobile Technology Products, http://www.mobilegear.com:80/laptop.htm, 2 pages, (1997).

*Primary Examiner*—Amare Mengistu
*Assistant Examiner*—David L. Lewis
*Attorney, Agent, or Firm*—Schwegman, Lundberg, Woessner & Kluth, P.A. & Anthony Claiborne

[57] ABSTRACT

A portable computer system having a shutter for protecting a display screen. The shutter device is disposed integrally within the bezel of a portable computer. The shutter device can be disposed proximate the two sides of a display within the bezel. In addition, the shutter device is disposed above the display screen. The device may be fabricated from paper, paper with a plastic coating, plastic, and similarly substantially rigid materials. Alternatively, other non-rigid materials can be used in conjunction with a support member for the shutter. The shutter device has a variety of forms including an accordion type structure, a fan structure. Alternatively, the shutter device comprises a plurality of panels which are hingedly coupled with support panels. The shutter device also can be in the form of a shade which coils around a coiling rod. A fastener is provided with the shutter device to maintain the device in an open and/or closed position.

29 Claims, 4 Drawing Sheets

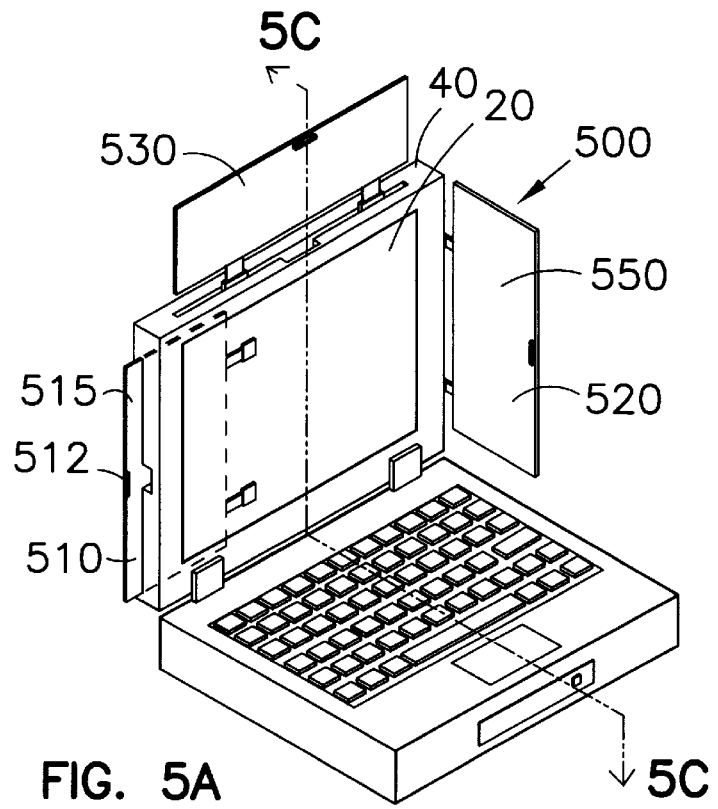
FIG. 5A
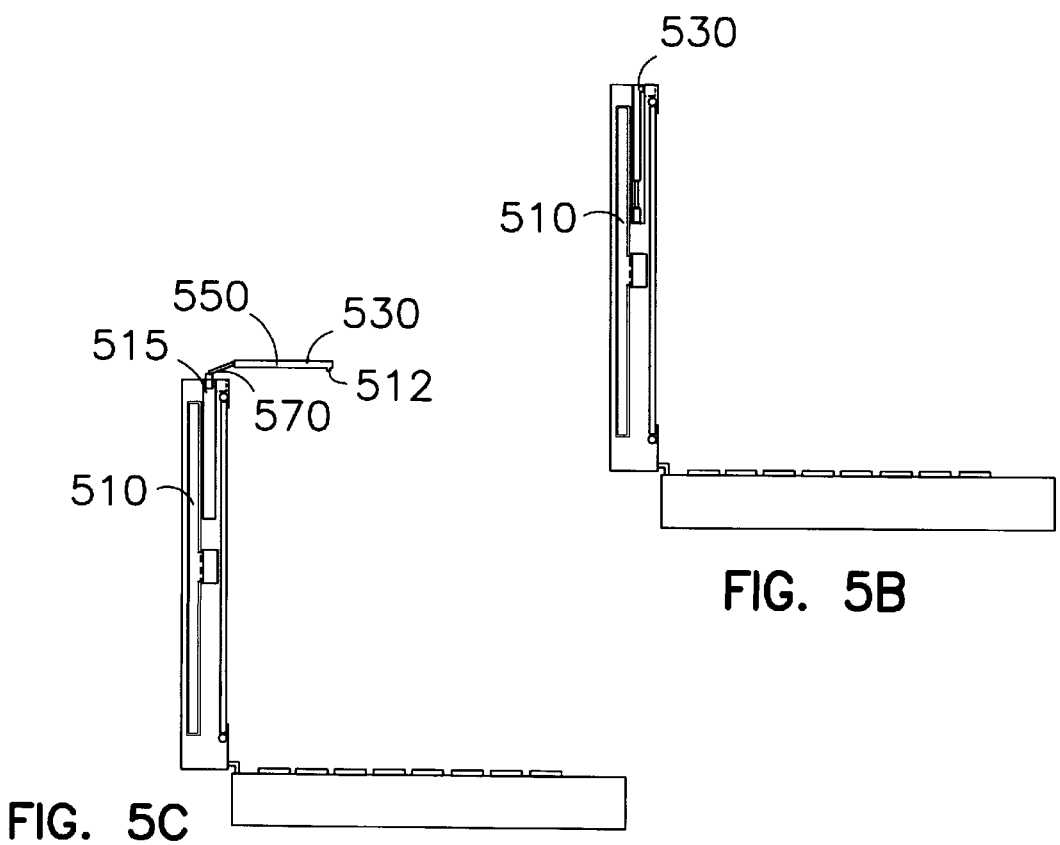
FIG. 5B
FIG. 5C

DISPLAY SHUTTER DEVICE FOR VIEW PROTECTION ON A PORTABLE COMPUTER

FIELD OF THE INVENTION

The present invention relates generally to portable computers. More particularly, it pertains to a portable computer having view protection.

BACKGROUND OF THE INVENTION

The use of lap top computers has increased dramatically as they have become more portable, and simultaneously more powerful. Computer users are now inclined to use their computers in places previously not possible before the prevalence of lap top computers. In addition, highly confidential information is often stored on the computer. Lap top computers are now being utilized in places such as in automobiles, planes, at home in an easy chair, or in bed. These places are much more comfortable to a user or at least provide more flexibility for users to have access to a computer. However, the surrounding environment may not always provide a suitable work area. For instance, a computer user may wish to work outside to enjoy pleasant weather. Although, direct sunlight to the screen or glare from the sun makes viewing the LCD rather difficult. As users operate the computer in a wide variety of places, the computer must acclimate to many different surroundings.

When computers are used in public places, the user is at risk of others reading the material displayed on the screen. As display screens for portable computers become larger and larger, it becomes even more difficult to maintain privacy surrounding the information display on the screen from other individuals nearby. Particularly, passenger seats on airplanes or trains are typically in close proximity to one another. During business travel or commuting, computers are often used in transit. Passengers seated adjacent to the computer user can easily read the display screen, thereby jeopardizing privacy to the computer user. Since highly confidential information may be on the computer screen, this is problematic for the computer user.

Additionally, public transportation, as well as private transportation, can involve computers being exposed to sunlight which may affect the computer users ability to view the display. Although airplanes are equipped with shades near each passenger's window, one passenger does not have control over whether other passengers close their window shades. Other methods of transportation such as commuter trains do not normally provide shades from the sunlight. Thus, the sunlight can cause significant glare from the computer screen, making it difficult for the user to see the LCD screen.

One approach to the above problems is disclosed in U.S. Pat. No. 5,400,903, issued to David M. Cooley on Mar. 28, 1995. A notebook computer carrying case is provided separate to a computer, and includes a top cover, a bottom cover, and an accordion-like shroud connecting the sides of the top and bottom covers.

The above approach, while solving some problems, creates additional ones and yet leaves other problems unaddressed. For instance, since computers or other electronic devices become smaller and smaller, carrying cases are becoming obsolete. Many computer users slip these components directly in to their briefcase, their purse, or their carry-on luggage. The protective carrying cases are often left behind in the office or the home while the user is traveling. Additionally, the above carrying case is large and bulky. Travelers typically minimize the amount of separate items which need to be individually carried. The above approach involves use of a separate case which is difficult to pack into a briefcase.

Another approach is provided by Mobile Office Outfitter of Newark, Calif., called The Glare Stopper™. This device comprises a separate foldable cardboard which attaches to tabs placed on the computer. The tabs are attached to the computer bezel with adhesive. When the device is not in place on the computer, the tabs remain on the bezel, giving the computer an unsightly appearance. In addition, the tabs placed on the bezel depress keys on the keyboard when the display is closed. The tabs can damage the keys when they are depressed for long periods of time. The device must be carried separate from the computer, and as a result, can become misplaced.

Accordingly, there is a need for a better way to provide protection to the liquid crystal display for computer users. What is also needed is a way to provide protection which is light weight, and integral to a lap top computer system.

SUMMARY OF THE INVENTION

A portable computer system is provided with an adjustable display screen. The portable computer system includes a computer and a computer body encompassing the computer. The computer body has a plurality of surfaces and a shutter integrally disposed at least partially within one of the surfaces of the computer body. The shutter can be placed in a first or open position and a second or closed position, and is adjustable therebetween. In an open position, the shutter shields a viewing screen from glare and also provides privacy, preventing others from viewing the display screen. In an closed position, the display screen may be closed to place the system in a storage position.

In one embodiment, the shutter device has a plurality of surfaces which form a plurality of pleats. Alternatively, in another embodiment, the shutter device has a generally circular outer periphery. In yet another embodiment, the shutter device extends substantially around the top and the two sides of the display screen. In one embodiment, the shutter device includes a sheet of flexible material which is received on a retractable coiling rod. The retractable coiling rod has a coiling mechanism couple with the rod for placing the shutter device in a closed position. Alternatively, in another embodiment, the shutter device comprises a plurality of slats.

As mentioned above, the shutter device is adjustable between the first or closed position and the second or open position. An extension member secured to the shutter device and the portable computer includes two links which fold together to place the shutter device in a closed position. The two links unfold to expand the shutter device into a second or open position.

In addition, the shutter device is provided with a fastener. The fastener retains the shutter device to a surface of the computer body in an open or closed position. In the closed position, the shutter device, in one embodiment, is substantially flush with a surface of the portable computer. The shutter device is made from opaque material such as paper or plastic. Depending on the embodiment, the shutter device can be made from either rigid or substantially non-rigid material.

The disclosed shutter device provides a convenient way to protect information displayed on an LCD screen. The screen is lightweight, such that it does not add significant weight to the portable computer. This is a further advantage since weight is frequently a pressing concern for portable computer manufacturers. In addition, other models of computers not equipped with such a device can be outfitted with the protective screen. The shutter device also aids in preventing significant glare on the LCD screen. Since the shutter device is integral with the computer, it will not become lost. Further, the shutter device does not interfere with shutting the portable computer, nor does it interfere with the keyboard.

The shutter device is retractable, which beneficially allows a computer user to share the computer for group projects or for playing computer games. When the shutter device is placed in a closed position, the lap top computer can be closed without interference from the shutter device. In addition, the shutter device is adjustable so that the computer user can select a desired amount of view protection or shade for the display screen. The shutter device is configurable so that only a top portion, or only a side portion of the display is protected. Advantageously, the user can block view from one side, but allow it for another side. The shutter device advantageously provides many benefits without adding significant weight to the portable computer.

BRIEF DESCRIPTION OF THE DRAWINGS

In the drawings, like numerals describe like components throughout the several views.

FIG. 5A is a perspective view illustrating a portable computer constructed in accordance with one embodiment of the present invention.

FIG. 5B is a side view illustrating a portable computer constructed in accordance with one embodiment of the present invention.

FIG. 5C is a side view illustrating a portable computer constructed in accordance with another embodiment of the present invention.

DESCRIPTION OF THE EMBODIMENTS

In the following detailed description, reference is made to the accompanying drawings which form a part hereof, and in which is shown by way of illustration specific embodiments in which the invention may be practiced. These embodiments are described in sufficient detail to enable those skilled in the art to practice the invention, and it is to be understood that other embodiments may be utilized and that structural changes may be made without departing from the spirit and scope of the present invention. Therefore, the following detailed description is not to be taken in a limiting sense, and the scope of the present invention is defined by the appended claims.

Figure 1:
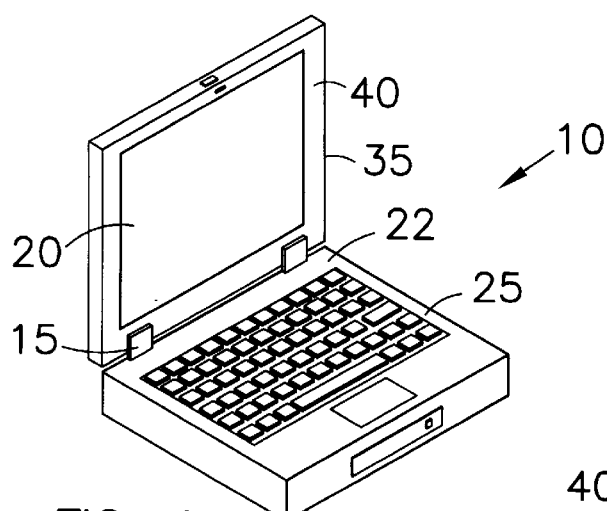
FIG. 1 is a perspective view of the prior art illustrating a conventional portable computer.

FIG. 1 illustrates a portable computer prior to installation of the present invention. The computer 10 has an upper chassis 35, a lower chassis 25, and a computer body 22. The upper chassis 35, generally having the shape of a rectangular panel, has a bezel 40 for encompassing a display 20 therein. The bezel 40 is integral with the upper chassis 35. The bezel 40 and the display 20 pivot about a hinge 15, providing adjustability for the display 20. The hinge 15 connects the lower chassis 25 of the computer 10 with the upper chassis 35, and allows for the upper chassis 35 to be closed upon the lower chassis 25.

During use, a computer user has the upper portion 35 of the computer in a generally upright position, as shown. The display 20 is sized to occupy a significant area of the upper portion 35. Thus, the display 20 is viewable from a position directly in front of the display 20, as well as positions at an angle to the display 20. The display 20 is viewable from a position above the display, such as viewing a screen above a user's shoulder. Alternatively, the display 20 could be viewed from a position to the side of a computer user, such as by a person seated next to the computer user. The present invention provides for protection to the display 20 and limits the viewability from angles other than directly in front of the computer.

Figure 2A:
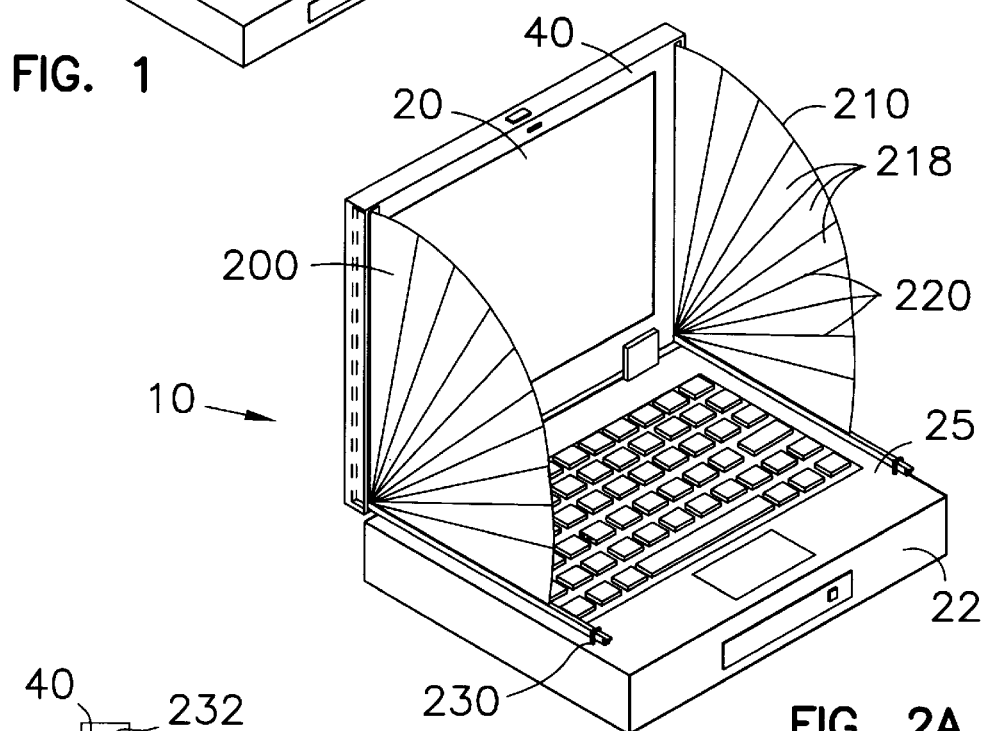
FIG. 2A is a perspective view illustrating a portable computer constructed in accordance with one embodiment of the present invention.
Figure 2B:
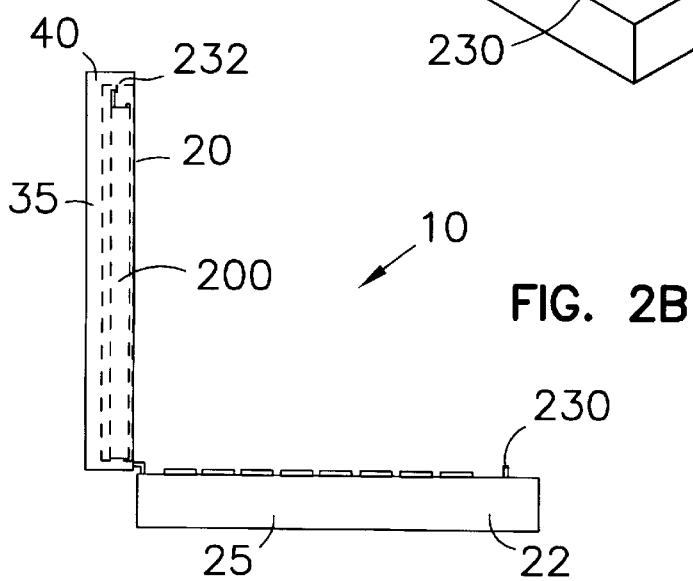
FIG. 2B is a side view illustrating a portable computer constructed in accordance with one embodiment of the present invention.

As illustrated in FIGS. 2A and 2B, a portable computer 10 is provided with a shutter device 200, where the shutter device 200 is integral with at least a portion of the portable computer 10. The shutter device 200, in one embodiment is provided on one side of the display 20. Alternatively, the shutter device 200 can be provided on the two sides of the display 20. The shutter device 200 has a generally circular outer periphery 210, and having the appearance of a fan, as shown in FIG. 2A. The shutter device 200 is comprised of a series of surfaces 218 forming a plurality of pleats 220. The plurality of pleats 220, in conjunction with the rigidity of the material, permit the shutter device 200 to remain in either a closed or a open position without further support. The width and the number plurality of pleats 220 are sufficient to expand the shutter device 200 from the bezel 40 to the base portion 25. The pleats 220 extend to a length of approximately half the size of the base portion 25, although other pleat lengths could also be implemented and are considered within the scope of the invention. The shutter device 200 is sized and formed such that when the upper portion 35 is closed with the base portion 25, the shutter device 200 does not interfere with the closing mechanism of the portable computer 10.

In an alternative embodiment, the shutter device 200 is provided with a fastener 230 for securing the shutter device 200 to the lower chassis 25. Using the fastener 230, the shutter device 200 is removably secured to the lower chassis 25. The computer user can remove the shutter device 200 from the lower chassis 25 when the shutter device 200 is not necessary, and then place the shutter device 200 within the bezel 40 as shown in FIG. 2B. When secured, the shutter device 200 is automatically opened when the upper chassis 35 is lifted away from the lower chassis 25. If a computer user does not require the protection or shade of the shutter device 200, the user disengages the fastener 230 from the shutter device 230 and then collapses the shutter device 230 to a retracted position within the bezel 40. A second fastener 232 disposed within the bezel 40 retains the shutter device 200 in a retracted position within the bezel 40. A wide variety of fasteners could be used for either fastener 230 or second fastener 232 such as a hook and loop material, a friction fitted plug secured to the device 200, a snap-fit mechanism integral with the bezel 40 or the lower chassis 25, a magnet assembly disposed between the device 200 and the bezel 40 or the lower chassis 25, or any other equivalent as known by those skilled in the art.

When the fastener 230 is implemented with the shutter device 200, the user opens the shutter device 200 and secures the device in an open position with the fastener 230. The pleats 220 of the shutter device 200 are unfolded thereby creating a generally planar surface proximate to the display 20. When the user no longer desires the protective features of the shutter device 200, the user places the shutter device 200 in a collapsed position. The shutter device 200 is substantially flush with the base portion when the device 200 is placed in the closed position. The shutter device 200 can be embedded within the bezel 40 to facilitate having a flush surface when the shutter device 200 is in a closed position. Although the shutter device 200 is discussed as opening from the base portion 25 up to the upper portion 35, the shutter device 200 could be embedded within the bezel 40 and opened toward the base portion 25. Further, an additional shutter device 200 could be provided on a top bezel portion 250 as an alternative to or in addition to the shutter device 200 providing side view protection. The shutter device 200 on the top bezel portion provides view protection from an overhead angle, such as when someone reads over the computer user's shoulder.

Figure 3A:
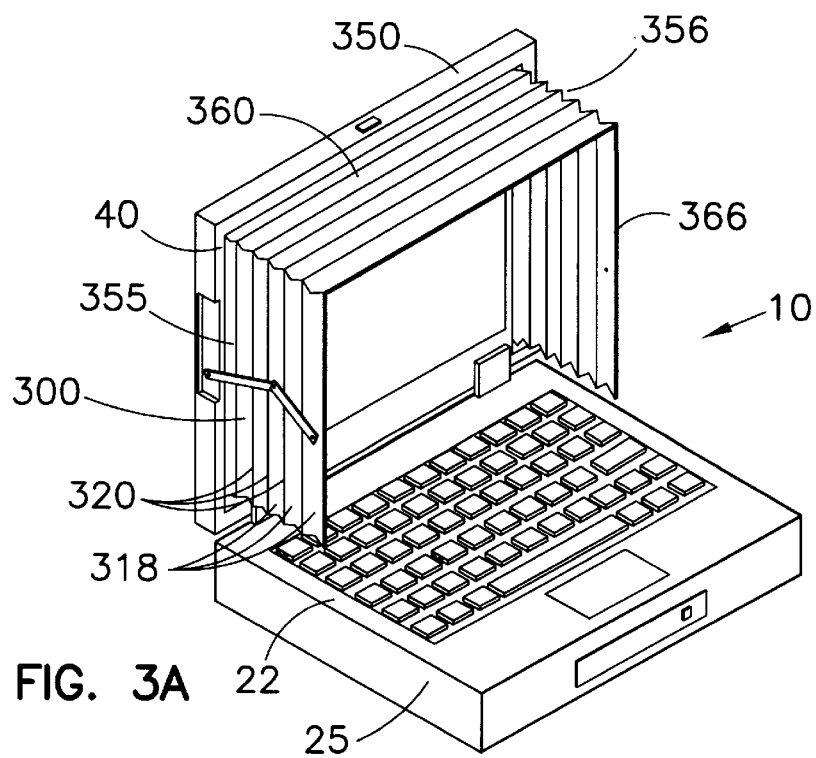
FIG. 3A is a perspective view illustrating a portable computer constructed in accordance with one embodiment of the present invention.
Figure 3B:
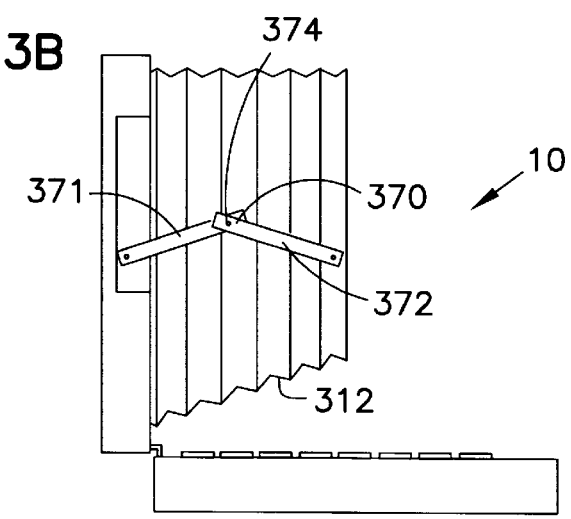
FIG. 3B is a side view illustrating a portable computer constructed in accordance with one embodiment of the present invention.
Figure 3C:
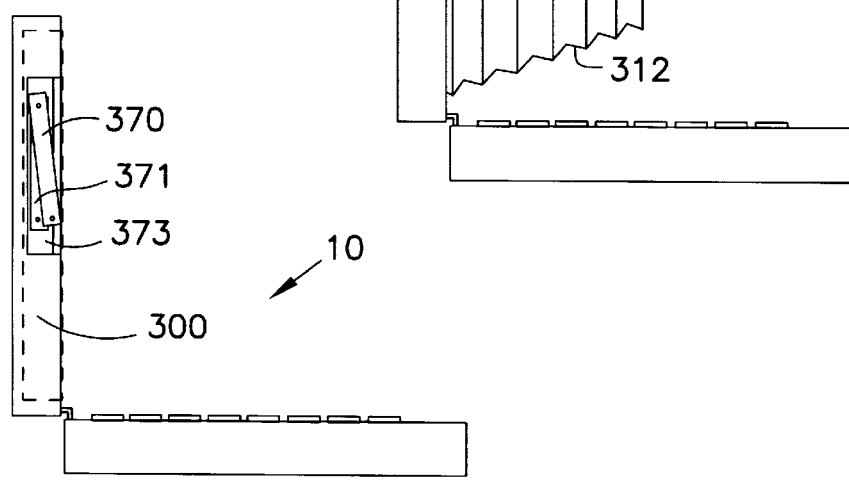
FIG. 3C is a side view illustrating a portable computer constructed in accordance with another embodiment of the present invention.

Another embodiment is shown in FIGS. 3A, 3B and 3C. The portable computer 10 is provided with a shutter device 300. The shutter device 300 extends substantially around three sides of the bezel 40 including a top bezel portion 350, and first and second side bezel portions, 355, 356 thereby forming a top panel 360, and first and second side panels 365 and 366, respectively. Having three panels disposed proximate to the display 20 provides extensive protection and shading for the display screen 20 from most angles. Alternatively, the shutter device 300 could be comprised of only the first and second side panels 365, 366 or only the top panel 360, or any subcombination thereof.

The shutter device 300 is comprised of a series of surfaces 318 forming a plurality of pleats 320. The plurality of pleats 320, in conjunction with the rigidity of the material of the shutter device 300, permit the shutter device 300 to remain in either a closed or a open position without further support. The first and second side panels 365, 366 each extend substantially along an entire side of the bezel 40, providing view and glare protection to the display from side angles. In another embodiment as shown in FIG. 3B, the first and second side panels 365, 366 are tapered on a bottom portion 312 for permitting greater adjustability of the display 20 for the computer user, while maintaining protection to the display 20. The top panel 360 and the first and second side panels 365, 366 of the shutter device 300, in an open position, extend toward a computer user to a position where the shutter device encompasses approximately a third of the size of the base portion toward the computer user, although a shutter device extending to shorter or longer positions could also be implemented and are considered within the scope of the invention.

In another embodiment, as shown in FIGS. 3B and 3C, the shutter device 300 is provided with an extension mechanism 370. The extension mechanism 370 provides support for the shutter device 300 and assists in placing the shutter device 300 in an open or closed position. The extension mechanism 370 is comprised of a first and second link, 371, 372 for facilitating movement of the shutter device 300. The first and second links 371, 372 meet at a hinge point 374 for folding the extension mechanism 3770 in to a storage position. When a user desires privacy or shade for the display 20, the user pulls the shutter device from a closed position, as shown in FIG. 3C, to an open position, as shown in FIG. 3B. The first and second links 371, 372 unfold from the folded storage position, and extend out from the display 20 as the shutter device 300 is moved to the open position. In the closed position, the first and second links 371, 372 are folded together and embedded within the bezel 40, as shown in FIG. 3C. The first and second links 371, 371 are seated within a recess 373 within the bezel 40 when placed in the closed position. Further, the shutter device 300 can be placed within the bezel 40 in the closed position, and can be substantially flush with the bezel 40. The extension mechanism 370 as shown is substantially centered on the side panels 365, 366, although other positions, such as near the top or bottom of the side panels, are considered within the scope of the invention. The extension mechanism 370 could also be positioned on the top panel 360. The first and second links 371, 372 are shown as one example of the extension mechanism 370 of the shutter device 300, although other types of extension mechanisms, such as a telescoping device, could be used as known by those skilled in the art.

Figure 4A:
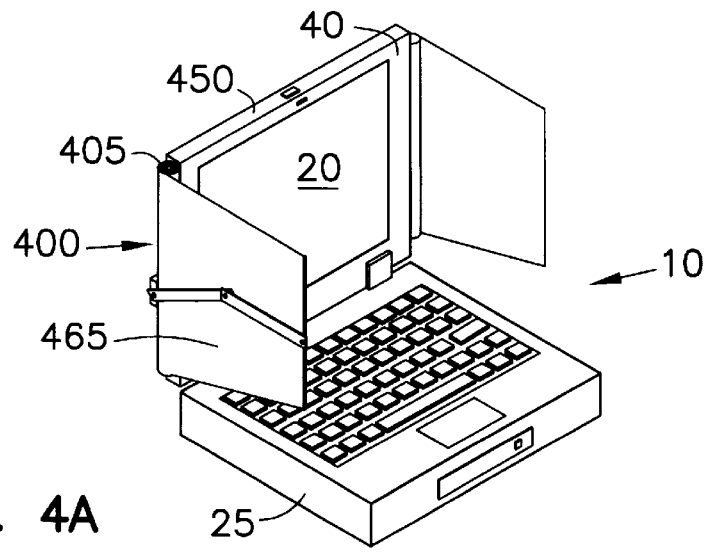
FIG. 4A is a perspective view illustrating a portable computer constructed in accordance with one embodiment of the present invention.
Figure 4B:
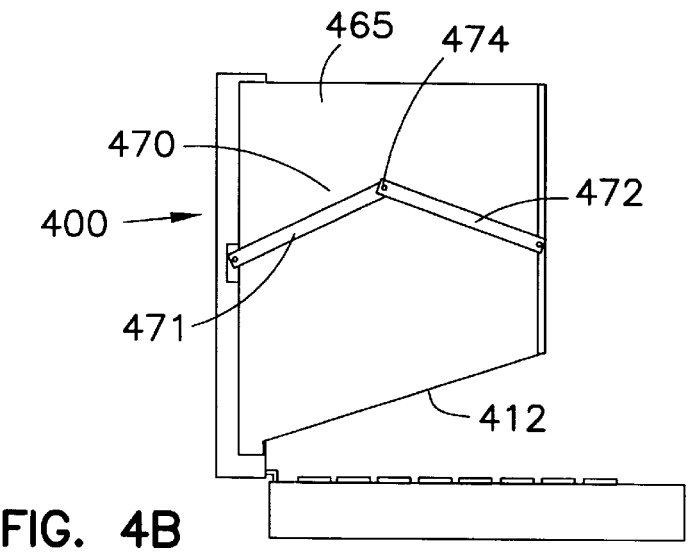
FIG. 4B is a side view illustrating a portable computer constructed in accordance with one embodiment of the present invention.
Figure 4C:
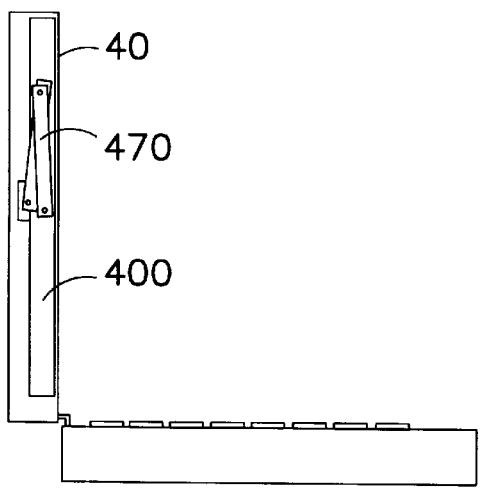
FIG. 4C is a side view illustrating a portable computer constructed in accordance with another embodiment of the present invention.

FIGS. 4A, 4B, and 4C illustrate another embodiment of the portable computer 10. A shutter device 400 is shown in an open position on a side of the bezel 40 in FIGS. 4A and 4B. Alternatively, the shutter device 400 could be provided on a top portion of the bezel 40 in addition to the side portions. The shutter device 400 is comprised of a sheet of flexible material, a retractable coiling rod 405, and a coiling mechanism (not shown) connected with the coiling rod 405. The flexible material of the shutter device 400 forms at least one privacy panel 465 adjacent the screen when placed in an open position. In one embodiment, the panel 465 protects three sides of the bezel 40, including a top bezel portion 450. The panels 465 disposed proximate to the display 20 provides extensive protection and shading for the display screen 20 from most angles. Each panel 465 extend substantially along an entire side of the bezel 40, providing view and glare protection to the display from side angles. In another embodiment as shown in FIG. 4B, the side panel 465 is tapered on a bottom portion 412 for permitting greater adjustability of the display 20 for the computer user, while maintaining protection to the display 20.

In one embodiment, the coiling mechanism comprises an axial coil spring. The coiling mechanism provides a force to the coiling rod 405 whereby the coiling rod 405 is rotated about its radial axis. The rotation of the coiling rod 405 winds the sheet of flexible material around the coiling rod 405 for placing the shutter device 400 in a closed position. When a user desires the protection and shading of the shutter device 400, a user applies a force in a direction away from the display 20 to rotate the coiling rod 405 to place the shutter device 400 in an open position. The shutter device 400 is shown in FIG. 4A exterior to the bezel 40, however, the shutter device 400, including the coiling rod 405, can be provided within the bezel 40 where the shutter device 400 is substantially flush with the bezel 40 in a closed position, as shown in FIG. 4C.

In another embodiment, as shown in FIG. 4B, the shutter device 400 is provided with an extension mechanism 470. The extension mechanism 470 is comprised of a first and second link, 471, 472 for providing support to the shutter device 400 in an open position. The first and second links 471, 472 meet at a hinge point 474 for folding the extension mechanism 470 in to a storage position. When a user desires privacy or shade to the display 20, the user pulls the shutter device from a closed position to an open position, as shown in FIG. 4A. The first and second links 471, 472 unfold and extend out from the display 20 as the shutter device 400 is moved in to the open position. Alternatively, the first and second links 471, 472 are frictionally engaged at the hinge point 474 such that the user can adjust the open position of the shutter device 400. In the closed position, the first and second links 471, 472 are folded at the hinge point 474 and placed in the storage position, embedded within the bezel 40. Further, the shutter device 400 can also be placed within the bezel 40 in the closed position, and is substantially flush with the bezel 40. The extension mechanism 470 as shown is substantially centered on the side panels 465, although other positions on the side panels are considered within the scope of the invention. Furthermore, the extension mechanism 470 could be positioned on the top panel (not shown). The first and second links 471, 472 are shown as one example of the extension mechanism 470 of the shutter device 400, although other types of extension mechanisms could be used as known by those skilled in the art.

FIGS. 5A, 5B and 5C illustrate another embodiment of the present invention. A portable computer 10 is provided with a shutter device 500. The shutter device 500 has a generally rectangular outer periphery 515, although periphery having an alternative shape could also be implemented. The shutter device 500 is comprised of a plurality of panels including a first and second side panel 510, 520, respectively, and a top panel 530. The panels 510, 520, 530 are each made from substantially rigid material. Each of the panels 510, 520, 530 are comprised of a support panel 540 and a protection panel 550. Each protection panel 550 has a raised portion 512 which provides a structure for a user to grasp as the panel 550 is manipulated. The support panel 540 and the protection panel 550 are rotatably coupled at a hinge point 570. Alternatively, the protection panel 550 could be hingedly coupled with the bezel 40. The protection panel 550 is held in frictional engagement with the support panel 540 at the hinge point 570. The frictional engagement allows the protection panel 550 to be adjustable to a plurality of angles relative to the display screen 20. The hinge point 570 permits adjustability of the protection panel 550, when the protection panel 550 is placed in an open position as shown in FIG. 5B. The support panel 540 remains within the bezel 40 during use of the shutter device 500 and supports the panels 510, 520, 530 while they are in use.

During operation, a computer user desiring display protection removes one or more of the panels 510, 520, 530 from the bezel 40. The computer user may select one, two, or all three of the panels 510, 520, 530 depending on the type of protection desired. Each panel is removed from within the bezel 40 until the hinge point 570 and the protection panel 550 is disposed outside of the bezel 40. A mechanical stop (not shown) could also be incorporated for preventing a user from over extending the panels 510, 520, 530. After placing the protection panel 550 in the open position, the protection panel 550 can further be adjusted depending on the environment the computer user is in.

When a computer user no longer requires view protection, or if the portable computer is to be placed in a storage position, as shown in FIG. 5C, the protection panel 550 is first aligned with the support panel 540, and then inserted in to the bezel 40. The bezel 40 has a storage chamber 560 for storing the panels 510, 520, 530 therein. The storage chamber 560 is a track for inserting the panels 510, 520, 530. The storage chamber 560 also provides protection to surrounding components within the bezel, which might otherwise be damaged if struck during removal and insertion of the panels 510, 520, 530. While the shutter device 500 is in a storage position, the protection panel 550 is flush with an outer surface 515 of the bezel 40.

For all of the above discussed embodiments, the materials which could be used for forming the shutter device include, but are not limited to, paper, cardboard, plastic coated paper, plastic, or other materials having sufficient rigidity and that can be provided in a substantially thin sheet. It is preferred that the material can be formed in to pleats or rolled such that the shutter device is collapsible either within a small space inside a computer body 22, or can be collapsed in to a substantially small shape, thereby permitting the upper portion 35 to be closed upon the base portion 25 without interference from the shutter device.

The disclosed shutter device provides a convenient way to protect information displayed on an LCD screen. The screen is lightweight, such that it does not add significant weight to the portable computer. This is a further advantage since weight is frequently a pressing concern for portable computer manufacturers. In addition, other models of computers not equipped with such a device can be outfitted with the protective screen. The screen aids in preventing significant glare on the LCD screen.

The shutter device is also retractable. Many computer users sometimes want others to view the display screen, for instance in group projects or for two people playing a computer game together. Thus, a further advantage of the shutter device is the retractable features. A computer user can implement the device when privacy is desired. When more than one person is using the computer, the device can then be placed in a closed position within the computer. When the device is placed in a closed position, a lap top computer can be closed without interference from the shutter device. In addition, the shutter device is adjustable so that the computer user can select a desired amount of view protection or shade for the display screen.

The shutter device as discussed above could be provided on both sides of the portable computer as shown in FIG. 3A. Alternatively, the shutter device could be provided additionally on a top portion also shown in FIG. 3A. In another configuration, the shutter device and the various embodiments thereof, could be provided integrally with a display for a desktop, such as a monitor. Furthermore, the material preferably comprises an opaque material, although a light transmissive material would be appropriate in certain situations, such as where only privacy considerations are being addressed. Alternatively, the shutter device could be provided with a reflective surface adjacent the display screen, for illuminating the keyboard in a low light work environment. If the shutter device prevents sufficient light for a user to see the keyboard or the screen, the shutter device could be used in conjunction with a lamp or light mounted on or within the computer bezel.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

What is claimed is:

1. A portable computer system including a display screen, the portable computer system comprising:
   a computer;
   a computer body encompassing said computer, said computer body having a plurality of surfaces; and
   a shutter device integrally coupled with at least one of the plurality of surfaces of said computer body, said shutter having a closed position exposing the display screen and an open position at least partially protecting the display screen.

2. The portable computer system as recited in claim 1, wherein the shutter device has a plurality of surfaces forming a plurality of pleats.

3. The portable computer as recited in claim 1, wherein said shutter device has a generally circular outer periphery and has the appearance of a fan.

4. The portable computer as recited in claim 1, where said shutter device extends substantially around three sides of the display screen.

5. The portable computer as recited in claim 1, where the shutter device comprises a sheet of flexible material and a retractable coiling rod.

6. The portable computer as recited in claim 1, where said shutter device comprises a plurality of slats, and each slat is adapted to seat with an adjacent slat.

7. The portable computer as recited in claim 1, wherein one of the surfaces of the computer body comprises a bezel surrounding the display screen, and said shutter device is coupled with said bezel.

8. The portable computer as recited in claim 1, wherein said shutter device is substantially flush with said surface of said computer body when the shutter device is in the closed position.

9. The portable computer as recited in claim 1, wherein said shutter device is comprised of opaque material.

10. The portable computer as recited in claim 1, wherein said shutter device is comprised of a paper based material.

11. The portable computer as recited in claim 10, wherein said paper based material has a plastic material disposed thereon.

12. The portable computer as recited in claim 1, wherein the shutter device has reflective surfaces facing the display screen.

13. A portable computer system including a display screen, the portable computer system comprising:
    a computer;
    a computer body encompassing said computer, said computer body having a plurality of surfaces; and
    a shutter device integrally coupled with at least one of the plurality of surfaces of said computer body,
    said shutter device comprises a plurality of panels including first side panel, a second side panel, and a top panel, and the first, second, and top panels are hingedly coupled at a hinge point, and each said panel having a closed position exposing the display screen and an open position at least partially protecting the display screen.

14. The portable computer as recited in claim 13, wherein the computer body has a storage chamber therein, said first and second side panels are each comprised of a support panel and a protection panel, and each support panel is received within said storage chamber.

15. The portable computer as recited in claim 14, wherein each support panel is hingedly coupled with the protection panel.

16. An apparatus for protecting output display of an electronic component, said apparatus comprising:
    a shutter device for protecting the output display, said shutter device having a closed position exposing the display screen and an open position at least partially protecting the display screen;
    an extension mechanism coupled with said shutter device; and
    a fastener for securing the shutter device to the electronic component.

17. The apparatus as recited in claim 16, wherein said extension mechanism comprises a first link coupled with a second link for facilitating movement of the shutter device.

18. The apparatus as recited in claim 16, wherein the first position includes the shutter assembly in an open position, and the second position includes the shutter assembly in a retracted position.

19. The apparatus as recited in claim 16, where said shutter device is adapted to extend substantially around three sides of the output display of the electronic component.

20. The apparatus as recited in claim 16, where the shutter device comprises a sheet of flexible material and a retractable coiling rod.

21. The apparatus as recited in claim 16, where said shutter device comprises a plurality of slats, and each slat is adapted to seat with an adjacent slat.

22. The apparatus as recited in claim 16, wherein said fastener frictionally engages the shutter device with said electronic component.

23. The apparatus as recited in claim 16, wherein said shutter device has a generally circular outer periphery and has the appearance of a fan.

24. The apparatus as recited in claim 23, wherein a portion of said fan is tapered away from the electronic component.

25. The apparatus as recited in claim 16, wherein the shutter device has a plurality of surfaces forming a plurality of pleats.

26. An apparatus for protecting output display of an electronic component, said apparatus comprising:
    a shutter device for protecting the output display, said shutter device having a closed position exposing the display screen and an open position, the shutter device having a plurality of panels; and
    the plurality of panels adapted to hingedly couple with the electronic component.

27. The apparatus as recited in claim 26, wherein said shutter device comprises a plurality of panels including a first side panel, a second side panel, and a top panel.

28. The apparatus as recited in claim 26, wherein said first and second side panels and said top panel are each comprised of a support panel and a protection panel.

29. The apparatus as recited in claim 28, wherein the support panel is hingedly coupled with the protection panel.

* * * * *